June 22, 1971    E. J. ARONOFF ET AL    3,586,526
TETRAVINYL PAINT COMPOSITION AND PAINTING PROCESS
Filed Aug. 4, 1969
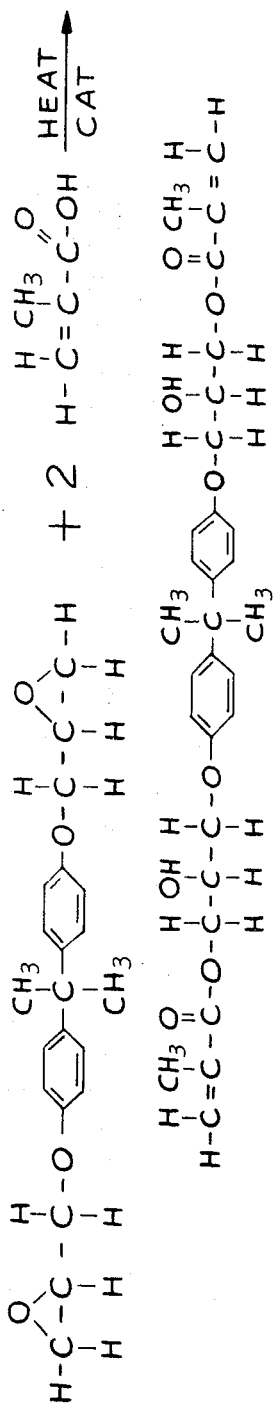
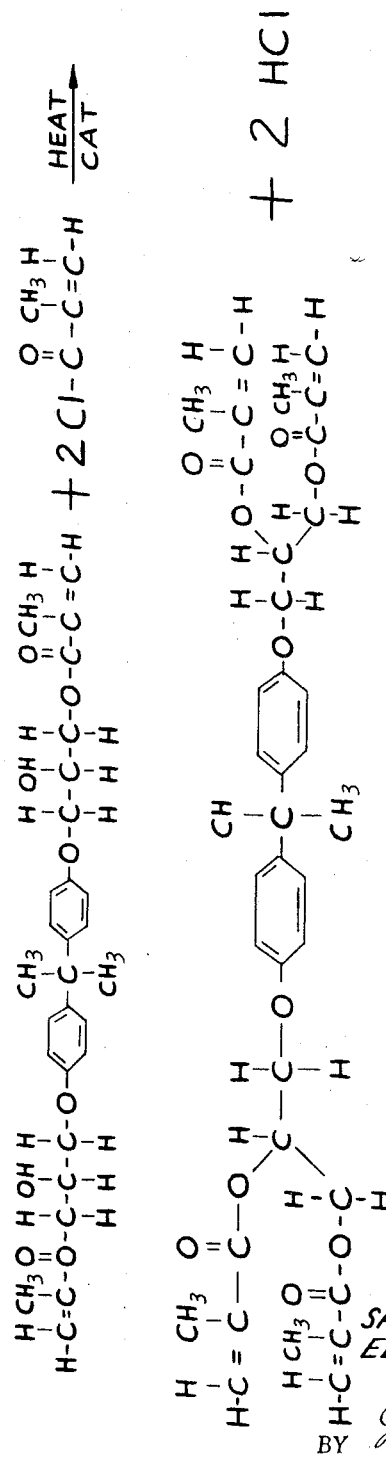
SANTOKH S. LABANA
ELIHU J. ARONOFF
INVENTORS
BY John R. Faulkner,
Olin B. Johnson
ATTORNEYS 3,586,526
TETRAVINYL PAINT COMPOSITION AND
PAINTING PROCESS
Elihu J. Aronoff, Framingham, Mass., and Santokh S.
Labana, Dearborn Heights, Mich., assignors to Ford
Motor Company, Dearborn, Mich.
Filed Aug. 4, 1969, Ser. No. 847,324
Int. Cl. B44d 1/50; C08f 1/24; C07c 69/52
U.S. Cl. 117—93.31
15 Claims

ABSTRACT OF THE DISCLOSURE

A substrate is coated with a film-forming composition comprising unique tetravinyl compound and the coating is converted to a tenaciously adhering, solvent-resistant, wear-and-weather-resistant coating by exposing the coated substrate to ionizing radiation, preferably in the form of an electron beam. This tetravinyl compound is formed by first reacting a diepoxide with acrylic acid and/or methacrylic acid and subsequently reacting the resultant ester condensation product with a vinyl unsaturated acyl halide.

---

This invention relates to the art of coating. It is particularly concerned with a process of painting a substrate having external surfaces of wood, glass, metal or polymeric solid with a film former comprising unique tetravinyl compounds and crosslinking such film former into a wear-resistant, weather-resistant, solvent-resistant, tenaciously adhering film by exposing the same to ionizing radiation, preferably in the form of an electron beam, and to the paint used in this process.

In this application, the term "paint" is meant to include pigment and/or finely ground filler, the binder without pigment and/or filler or having very little of the same, which can be tinted if desired. Thus, the paint binder which is ultimately cross linked by ionizing radiation can be all or virtually all that is used to form the film, or it can be a vehicle for pigment and/or particulate filler material.

The first reaction step in preparing the tetravinyl compounds used herein is illustrated by the representative reaction shown in FIG. 1 of the accompanying drawing. The second reaction step is illustrated by the representative reaction shown in FIG. 2.

The diepoxides employed as starting materials for preparing the tetravinyl compounds of this invention may be of the epichlorohydrin-bisphenol type, the epichlorohydrin-polyalcohol type, or those prepared by reacting diolefins with peracids, e.g., peracetic acid, or other means. Diepoxides and their preparation are discussed in detail in Modern Surface Coatings, Paul Nylen and Edward Sunderland, 1965 Science Publishers, a division of John Wiley & Sons Ltd., London-New York-Sydney, Library of Congress Catalog Card Number 65–28344, pp. 197–208. Representative diepoxides include, but not by way of limitation, the following:

(1) 3,4 - epoxy - 6-methyl-cyclohexylmethyl-3,4-epoxymethylcyclohexanecarboxylate.
(2) 1-epoxyethyl-3,4-epoxycyclohexane.
(3) dipentene dioxide (limonene dioxide).
(4) dicyclopentadienedioxide.
(5) diepoxides having structural formula in accordance with the following:

a. 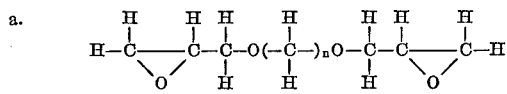

b. 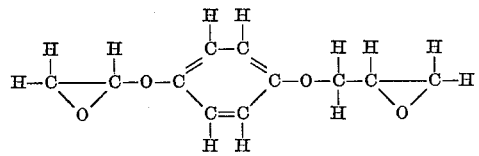

c. 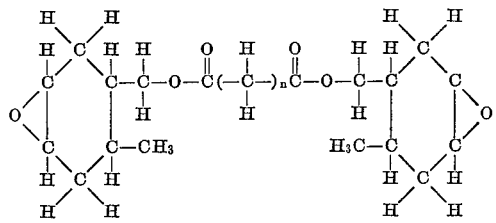

Other suitable diepoxides are disclosed in U.S. Pats. 2,890,202; 3,256,226; 3,373,221 and elsewhere throughout the literature.

The diepoxides employed will usually have molecular weights below about 2,000, more commonly in the range of about 140 to about 500. Usually, the diepoxides will consist of carbon, hydrogen and oxygen but they may be substituted, if desired, with non-interfering substituents, such as halogen atoms, ether radicals and the like. They may be saturated or unsaturated, aliphatic, cycloaliphatic, aromatic or heterocyclic. They may be monomeric or polymeric.

The vinyl unsaturated acyl halides are preferably acryloyl chloride and/or methacryloyl chloride but others may be used, e.g. the corresponding bromides.

The resultant tetravinyl compounds used herein are homopolymerizable and copolymerizable with mono- and divinyl monomers, e.g., styrene, vinyl toluene, alpha-methyl styrene, divinyl benzene, methyl methacrylate, ethyl acrylate, butyl acrylate, butyl methacrylate, hydroxypropyl methacrylate, glycidyl methacrylate, etc., the divinyl reaction product formed by reacting monoepoxide with acrylic acid or methacrylic acid and then reacting the resultant product with a vinyl unsaturated acyl halide the divinyl reaction product formed by reacting a diepoxide with two molar parts of acrylic acid or methacrylic acid, the divinyl reaction product formed by reacting a diepoxide with two molar parts of acrylic acid or methacrylic acid and subsequently reacting the resultant ester condensation product with two molar parts of a saturated acyl halide, e.g., acetyl chloride or an effectively saturated acyl halide, e.g., benzoyl chloride, the divinyl reaction product formed by reacting one molar part of a diepoxide with two molar parts of acrylic or methacrylic acid and subsequently reacting the resultant ester condensation product with two molar parts of an alpha-beta olefinically unsaturated acyl halide having an aromatic radical affixed to the beta carbon of the olefinic linkage, e.g., cinnamic acid chloride, alpha-beta olefinically unsaturated polymers, etc.

The tetravinyl adducts used herein have lower viscosities than their corresponding divinyl compounds produced by reacting one mole of diepoxide with two moles of acrylic acid or methacrylic acid. In relation to such divinyl compounds, the tetravinyl compounds are also more sensitive to ionizing radiation and have increased solubility in organic solvents.

A minor portion, i.e. up to slightly below about 50 weight percent of the tetravinyl compound may be replaced with a divinyl compound consisting essentially of carbon, hydrogen and oxygen and having a molecular weight below about 2,600, preferably about 220 to about 1,100, more preferably about 220 to about 650, such as one of the divinyl compounds hereinbefore mentioned and hereinafter illustrated.

The films formed from the paints of this invention are advantageously cured at relatively low temperatures, e.g. between room temperature (20° to 25° C.) and about 70° C. The radiation energy is applied at dose rates of about 0.1 to about 100 Mrad per second upon a preferably moving workpiece until the wet film is converted to tack-free state or until the film is exposed to a desired dosage.

The film-forming material advisedly has an application viscosity low enough to permit rapid application to the substrate in substantially even depth and high enough so that at least 1 mil (0.001 inch) film will hold upon a vertical surface without sagging. Such films will ordinarily be applied to an average depth of about 0.1 to about 4 mils with appropriate adjustment in viscosity and application technique. It will be obvious to those skilled in the art that the choice of diepoxide used in preparing the tetravinyl compound can be varied so as to vary the viscosity of the resultant product. Likewise, the viscosity of the total film-forming composition can be varied by the choice of other polymerizable components of the coating composition. The viscosity can also be adjusted by the addition of nonpolymerizable, volatile solvents, e.g., toluene, xylene, etc., which can be flashed off after application. By one or more of such adjustments, the viscosity of the paint binder solution can be adapted for application by conventional paint application techniques, e.g. spraying, roll coating, etc. The paint binder is preferably applied to the substrate and cured thereon as a continuous film of substantially even depth.

This invention will be more fully understood from the following illustrative examples.

EXAMPLE 1

A tetravinyl compound is prepared in the manner below set forth from the materials hereinafter named:

(1) To a reaction vessel equipped with condenser, stirrer, nitrogen inlet and thermometer are charged the following materials:

| | Parts by wt. |
|---|---|
| (a) Diepoxide [1] | 192 |
| (b) Methacrylic acid | 86 |
| (c) Toluene (solvent) | 500 |
| (d) Dimethyl benzylamine (catalyst) | 1 |

[1]
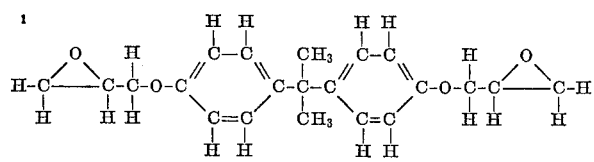

(2) The diepoxide, the methacrylic acid and the dimethyl benzylamine are intimately mixed and incrementally added to the toluene which is at 90° C. in a nitrogen atmosphere.

(3) The reaction mixture is maintained at 90° C. until reaction of the epoxide groups is essentially complete as measured by a product acid number of less than about 10.

(4) The solvent is removed under vacuum and a solid reaction product (softening point 45° C.) is recovered.

(5) The solid reaction product of (4) in the amount of 280 parts by weight is dissolved in 500 parts by weight toluene, and 110 parts by weight of methacryloyl chloride are added dropwise with the reaction mixture maintained at 65° C. until HCl evolution ceases.

(6) The solvent is removed under vacuum and a tetravinyl compound is recovered in the form of a viscous liquid.

Substrates of wood, glass, metal and polymeric solid, i.e. polypropylene and acrylonitrile-butadiene-styrene copolymer, are coated with this tetravinyl compound using the following procedure:

(1) The above prepared tetravinyl compound is diluted to spraying viscosity with xylene and a paint film is sprayed on the aforementioned substrates to an average depth of about 1 mil (0.001 inch) and the solvent flashed off.

(2) The coated substrate is passed through a nitrogen atmosphere and at a distance of about 10 inches below the electron emission window of a cathode ray type electron accelerator through which an electron beam is projected upon the coated surface until the wet coating is polymerized to a tack-free state. The electrons of this beam have an average energy of about 275,000 electron volts with a current of about 25 milliamperes.

EXAMPLE 2

The procedure of Example 1 is repeated except that the diepoxide employed is 3,4-epoxy-6-methyl cyclohexylmethyl-3,4-epoxymethyl cyclohexanecarboxylate.

EXAMPLE 3

The procedure of Example 1 is repeated except that the diepoxide empolyed is 1-epoxyethyl-3,4-epoxycyclohexane.

EXAMPLE 4

The procedure of Example 1 is repeated except that the diepoxide employed is dipentene dioxide.

EXAMPLE 5

The procedure of Example 1 is repeated except that the diepoxide employed is dicyclopentadienedioxide.

EXAMPLE 6

The procedure of Example 1 is repeated except that the diepoxide employed has structural formula in accordance with the formula hereinbefore set forth and identified as diepoxide (5)$a$ wherein $n$ is 4.

EXAMPLE 7

The procedure of Example 1 is repeated except that the diepoxide employed has structural formula in accordance with the formula hereinbefore set forth and identified as diepoxide (5)$b$.

EXAMPLE 8

The procedure of Example 1 is repeated except that the diepoxide employed has structural formula in accordance with the formula hereinbefore set forth and identified as diepoxide (5)$c$ wherein $n$ is 4.

EXAMPLE 9

The procedure of Example 1 is repeated with the sole difference that the electrons of the electron beam have an average energy of about 350,000 electron volts.

EXAMPLE 10

The procedure of Example 1 is repeated with the sole difference that the atmosphere of irradiation is helium.

EXAMPLE 11

The procedure of Example 1 is repeated with the sole difference that acryloyl chloride is substituted for the methacryloyl chloride.

EXAMPLE 12

The procedure of Example 1 is repeated with the sole difference that methacryloyl bromide is used in lieu of methacryloyl chloride.

EXAMPLE 13

The procedure of Example 1 is repeated with the sole difference that acryloyl bromide is substituted for the methacryloyl chloride.

EXAMPLE 14

The procedure of Example 1 is repeated with the sole difference that the diepoxide is first reacted with a mixture of acrylic acid and methacrylic acid.

EXAMPLE 15

A tetravinyl compound is prepared as in Example 1 and a divinyl compound is prepared using the same procedure with the single exception that butyric acid chloride is substituted for the second step reactant methacryloyl chloride used in the preparation of the tetravinyl compound. Substrates are then coated as in Example 1 using a paint binder composition consisting of 51 parts by weight of the tetravinyl compound, 49 parts by weight of the divinyl compound, and acetone in an amount sufficient to provide the composition with good spraying viscosity. The substrates are coated with this composition and the acetone flashed off prior to irradiaation. Irradiation conditions are the same as in Example 1.

Additional substrates are coated in like manner except that the paint binder composition consists of 99 parts by weight of said tetravinyl compound, 1 part by weight of said divinyl compound, and said acetone.

Additional substrates are coated in like manner except that the paint binder composition consists of 75 parts by weight of said tetravinyl compound, 25 parts by weight of said divinyl compound, and said acetone.

EXAMPLE 16

A tetravinyl compound is prepared as in Example 1 and a divinyl compound is prepared using the same procedure with the single exception that cinnamic acid chloride is substituted for the second step reactant methacryloyl chloride used in preparation of the tetravinyl compound. Substrates are then coated as in Example 1 using a paint binder composition consisting of 51 parts by weight of the tetravinyl compound, and toluene in an amount sufficient to provide the composition with a good spraying viscosity. The substrates are coated with this composition and the toluene flashed off prior to irradiation. Irradiation conditions are the same as in Example 1.

Additional substrates are coated in like manner except that the paint binder composition consists of 99 parts by weight of said tetravinyl compound, 1 part by weight of said divinyl compound, and said toluene.

EXAMPLE 17

A tetravinyl compound is prepared as in Example 1 and a divinyl compound is prepared using the same procedure with the single exception that 1 molar part of cyclopentene oxide is reacted with 1 molar part of methacrylic acid to open the epoxide ring and provide a monovinyl compound and then the resultant ester condensation product is reacted with methacryloyl chloride to provide a divinyl compound. Substrates are coated as in Example 1 using a paint binder composition consisting of 51 parts by weight of the tetravinyl compound, 49 parts by weight of the divinyl compound, and xylene in an amount sufficient to provide the composition with good spraying consistency. The substrates are coated with this composition and the xylene flashed off prior to irradiation. Irradiation conditions are the same as in Example 1.

Additional substrates are coated in like manner except that the paint binder composition consists of 99 parts by weight of said tetravinyl compound, 1 part by weight of said divinyl compound, and said xylene.

EXAMPLE 18

A tetravinyl compound is prepared as in Example 1 and a divinyl compound is prepared using the same procedure employed in the first step of preparing the tetravinyl compound. Substrates are coated as in Example 1 using a paint binder composition consisting of 51 parts by weight of said tetravinyl compound, 49 parts by weight of said divinyl compound, and xylene in an amount sufficient to provide the composition with good spraying consistency. The substrates are coated with this composition and the xylene flashed off prior to irradiation. Irradiation conditions are the same as in Example 1.

Additional substrates are coated in like manner except that the paint binder composition consists of 99 parts by weight of said tetravinyl compound, 1 part by weight of said divinyl compound, and said xylene.

EXAMPLE 19

The procedure of Example 15 is repeated except for the sole difference that benzoyl chloride is substituted for the butric acid chloride.

The term "ionizing radiation" as employed herein means radiation having sufficient energy to effect polymerization of the paint films herein disclosed, i.e., energy equivalent to that of about 5,000 electron volts or greater. The preferred method of curing films of the instant paints upon substrates to which they have been applied is by subjecting such films to a beam of polymerization effecting electrons having an average energy in the range of about 100,000 to about 500,000 electron volts. When using such a beam, it is preferred to employ a minimum of 25,000 electron volts per inch of distance between the radiation emitter and the workpiece when the intervening space is occupied by air. Adjustment can be made for the relative resistance of the intervening gas which is preferably an oxygen-free inert gas such as nitrogen or helium.

The abbreviation "rad" as employed herein means that dose of radiation which results in the absorption of 100 ergs of energy per gram of absorber, e.g. coating film. The abbreviation "Mrad" as employed herein means 1 million rad. The electron emitting means may be a linear electron accelerator capable of producing a direct current potential in the range of about 100,000 to about 500,000 volts. In such a device electrons are ordinarily emitted from a hot filament and accelerated through a uniform voltage gradient. The electron beam, which may be about ⅛ inch in diameter at this point, may then be scanned to make a fan-shaped beam and then passed through a metal window, e.g. a magnesium-thorium alloy, aluminum, an alloy of aluminum and a minor amount of copper, etc., of about 0.003 inch thickness.

It will be understood by those skilled in the art that modifications can be made within the foregoing examples without departing from the spirit and scope of the invention as set forth in the following claims.

What is claimed is:

1. A paint polymerizable by ionizing radiation which, exclusive of nonpolymerizable solvents, pigments and particulate mineral filler, consists essentially of a tetravinyl compound formed by first reacting one molar part of a diepoxide with two molar parts of an alpha-beta olefinically unsaturated monocarboxylic acid selected from acrylic acid and methacrylic acid and subsequently reacting the resultant divinyl ester condensation product with two molar parts of a vinyl unsaturated acyl halide.

2. A paint in accordance with claim 1 wherein said diepoxide has a molecular weight below about 2,000.

3. A paint in accordance with claim 1 wherein said diepoxide has a molecular weight in the range of about 140 to about 500.

4. A paint in accordance with claim 1 wherein said acyl halide is the chloride of acrylic or methacrylic acid.

5. A paint in accordance with claim 1 wherein said acyl halide is the bromide of acrylic or methacrylic acid.

6. A paint in accordance with claim 1 wherein an amount up to but less than 50% of said tetravinyl compound is replaced with a divinyl compound consisting essentially of carbon, hydrogen and oxygen and having a molecular weight below about 2,600.

7. A paint in accordance with claim 1 wherein an amount up to but less than 50% of said tetravinyl compound is replaced with a divinyl compound having a molecular weight below about 2,600 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of a saturated acyl halide.

8. A paint in accordance with claim 1 wherein an amount up to but less than 50% of said tetravinyl compound is replaced with a divinyl compound having a molecular weight below about 2,600 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of an alpha-beta olefinically unsaturated acyl halide having an aromatic radical affixed to the beta carbon of the olefinic linkage.

9. A paint in accordance with claim 1 wherein an amount up to but less than 50% of said tetravinyl compound is replaced with a divinyl compound having a molecular weight below about 2,600 and formed by reacting one molar amount of a diepoxide with two molar parts of an alpha-beta olefinically unsaturated monocarboxylic acid selected from acrylic acid and methacrylic acid.

10. A paint in accordance with claim 1 wherein an amount up to but less than 50% of said tetravinyl compound is replaced with a divinyl compound having molecular weight below about 2,600 and formed by first reacting one molar part of a diepoxide with two molar parts of an alpha-beta olefinically unsaturated monocarboxylic acid selected from acrylic acid and methacrylic acid and subsequently reacting the resultant condensation product with two molar parts of an aromatic substituted saturated acyl halide.

11. A paint in accordance with claim 1 wherein an amount up to but less than 50% of said tetravinyl compound is replaced with a divinyl compound consisting essentially of carbon, hydrogen and oxygen and having a molecular weight in the range of about 220 to about 1100.

12. A paint in accordance with claim 1 wherein an amount up to but less than 50% of said tetravinyl compound is replaced with a divinyl compound consisting essentially of carbon, hydrogen and oxygen and having a molecular weight in the range of about 220 to about 650.

13. A paint in accordance with claim 1 wherein an amount up to but less than 50% of said tetravinyl compound is replaced with a divinyl compound having a molecular weight in the range of about 220 to about 650 and formed by reacting a monoepoxide with an alpha-beta olefinically unsaturated monocarboxylic acid selected from acrylic acid and methacrylic acid and then reacting the resultant ester condensation product with a vinyl unsaturated acyl halide.

14. In a method for painting a substrate wherein a film-forming solution is applied as a paint film to a surface of said substrate and crosslinked thereon by exposing the coated surface to ionizing radiation, the improvement wherein said film-forming solution, exclusive of nonpolymerizable solvents, pigments and particulate mineral filler, consists essentially of a tetravinyl compound formed by first reacting one molar part of a diepoxide with two molar parts of an alpha-beta olefinically unsaturated monocarboxylic acid selected from acrylic acid and methacrylic acid and subsequently reacting the resultant divinyl ester condensation product with two molar parts of a vinyl unsaturated acyl halide.

15. An article of manufacture comprising in combination a substrate and a polymerized coating of paint formed upon an external surface thereof by applying to said surface a film of substantially even depth of a film-forming solution which, exclusive of nonpolymerizable solvents, pigments and particulate mineral filler, consists essentially of a tetravinyl compound formed by first reacting one molar part of a diepoxide with two molar parts of an alpha-beta olefinically unsaturated monocarboxylic acid selected from acrylic acid and methacrylic acid and subsequently reacting the resultant divinyl ester condensation product with two molar parts of a vinyl unsaturated acyl halide, and cross-linking said film on said surface with ionizing radiation.

References Cited

UNITED STATES PATENTS 3,466,259   9/1969   Jernigan _____ 260—836X

FOREIGN PATENTS 1,006,587   10/1965   Great Britain _____ 260—486

ALFRED L. LEAVITT, Primary Examiner

J. H. NEWSOME, Assistant Examiner

U.S. Cl. X.R.

117—138.8, 161; 204—159.15, 159.16; 260—410.6, 475, 485, 486, 835, 836, 857